(12) United States Patent
Liu

(10) Patent No.: US 12,084,808 B2
(45) Date of Patent: Sep. 10, 2024

(54) SELF-CLEANING COATING, SELF-CLEANING FIBER, SELF-CLEANING CARPET AND USES THEREOF

(71) Applicant: Feng Liu, Shanghai (CN)

(72) Inventor: Feng Liu, Shanghai (CN)

( * ) Notice: Subject to any disclaimer, the term of this patent is extended or adjusted under 35 U.S.C. 154(b) by 940 days.

(21) Appl. No.: 17/049,546

(22) PCT Filed: Oct. 31, 2018

(86) PCT No.: PCT/CN2018/113109
§ 371 (c)(1),
(2) Date: Oct. 21, 2020

(87) PCT Pub. No.: WO2019/205551
PCT Pub. Date: Oct. 31, 2019

(65) Prior Publication Data
US 2021/0324573 A1   Oct. 21, 2021

(30) Foreign Application Priority Data

Apr. 23, 2018 (CN) .......................... 201810364723.8

(51) Int. Cl.
*D06M 11/46* (2006.01)
*A47G 27/02* (2006.01)
(Continued)

(52) U.S. Cl.
CPC ............. *D06M 11/46* (2013.01); *A47G 27/02* (2013.01); *D06M 11/48* (2013.01); *D06M 11/78* (2013.01);
(Continued)

(58) Field of Classification Search
CPC ...... D06M 11/46; D06M 11/48; D06M 11/78; D06M 23/08; D06M 2101/34;
(Continued)

(56) References Cited

U.S. PATENT DOCUMENTS

2005/0266235 A1* 12/2005 Nakajima ................ C08J 7/054
428/446
2008/0250978 A1* 10/2008 Baumgart ................ C09D 7/45
106/287.18
(Continued)

FOREIGN PATENT DOCUMENTS

| CN | 1687506 | 10/2005 |
|---|---|---|
| CN | 1693377 | 11/2005 |

(Continued)

OTHER PUBLICATIONS

Machine Translation CN 106833040A (Year: 2017).*
(Continued)

*Primary Examiner* — Elizabeth M Imani
(74) *Attorney, Agent, or Firm* — HSML P.C.

(57) ABSTRACT

Provided are a self-cleaning coating, a self-cleaning fiber, a self-cleaning carpet and uses thereof. The self-cleaning coating is provided with a porous structure where pores communicate with one another; the volume of the pores comprised in the coating makes up 20%-98% of the total volume of the coating; and the pore diameter of the pores in the porous structure is between 0.5 nm-50 nm. The self-cleaning coating is mainly prepared from host materials; the host materials are one or more of titanium oxide, zirconia, titanium nitride, silicon oxide, tungsten oxide, g-$C_3N_4$ semi-conducting polymer, perovskite semiconductor, silver, iron, gold, aluminum, copper, zinc, tin and platinum.

18 Claims, 5 Drawing Sheets

(51) Int. Cl.
  *B82Y 30/00*     (2011.01)
  *B82Y 40/00*     (2011.01)
  *D06M 11/48*     (2006.01)
  *D06M 11/78*     (2006.01)
  *D06M 23/08*     (2006.01)
  *D06M 101/34*    (2006.01)

(52) U.S. Cl.
  CPC ............ *D06M 23/08* (2013.01); *B82Y 30/00* (2013.01); *B82Y 40/00* (2013.01); *D06M 2101/34* (2013.01); *D06M 2200/01* (2013.01); *D06M 2200/12* (2013.01)

(58) Field of Classification Search
  CPC ......... D06M 2200/01; D06M 2200/12; D06M 11/44; D06M 11/45; D06M 11/74; D06M 11/79; D06M 11/83; D06M 13/513; D06M 15/643; D06M 11/58; A47G 27/02; B82Y 30/00; B82Y 40/00; C01P 2002/54; C01P 2004/10; C03C 2217/212; C03C 2217/219; C03C 2217/22; C03C 2217/23; C03C 2217/71; C03C 2218/112; C03C 2217/24; C03C 17/006; C03C 17/256; C01B 21/0615; C01G 23/0532; C01G 23/0536; C01G 25/02; C09D 7/62; C09D 1/00; C09D 5/1681; C09D 5/1687; C09D 7/61; C09D 7/67; C09D 7/70; C09D 7/80; C09D 5/24

USPC ....................................................... 428/375
See application file for complete search history.

(56) References Cited

U.S. PATENT DOCUMENTS

2010/0118409 A1    5/2010   Henz et al.
2011/0305827 A1   12/2011   Boilot et al.

FOREIGN PATENT DOCUMENTS

| CN | 101643214 | 2/2010 | |
| CN | 103031008 | 4/2013 | |
| CN | 103880297 | 6/2014 | |
| CN | 106082692 | 11/2016 | |
| CN | 106833040 | 6/2017 | |
| CN | 108410221 | 8/2018 | |
| WO | 2009037072 | 3/2009 | |
| WO | WO-2010001053 A2 * | 1/2010 | ........... C03C 17/006 |
| WO | 2018193208 | 10/2018 | |

OTHER PUBLICATIONS

International Search Report issued for International Patent Application No. PCT/CN2018/113109, Date of mailing: Jan. 30, 2019, 7 pages including English translation.
Extended European Search Report issued for European Patent Application No. 18916780.2, dated Mar. 2, 2022, 11 pages.

* cited by examiner

SELF-CLEANING COATING, SELF-CLEANING FIBER, SELF-CLEANING CARPET AND USES THEREOF

CROSS-REFERENCE TO RELATED APPLICATIONS

This application is a 371 of PCT/CN2018/113109 filed Oct. 31, 2018, and claims priority to Chinese patent application No. 201810364723.8, filed on Apr. 23, 2018, entitled "SELF-CLEANING COATING", the entire content of which is incorporated herein by reference.

TECHNICAL FIELD

The present disclosure relates to the field of self-cleaning technology, in particular, to self-cleaning coatings, self-cleaning fibers, self-cleaning carpets, and uses thereof.

BACKGROUND

With the development of society and the improvement of people's quality of life, self-cleaning products have attracted more and more attention. According to different self-cleaning principles, two major types of products, namely super-hydrophobic products and super-hydrophilic products, are mainly available in the market at present. The super-hydrophilic technology is to take away and isolate pollutants by forming a water film on a surface of the super-hydrophilic product, thereby achieving self-cleaning. The super-hydrophobic technology is to take away pollutants through the rolling of water droplets, so as to achieve self-cleaning. However, in practical applications of the super-hydrophilic technology, the super-hydrophilic product is often polluted by deposits formed by organic matter in the air, resulting in loss of hydrophilicity over time. While for practical applications of the super-hydrophobic technology, in addition to the pollution by the organic matter as described above, since the super-hydrophobic product forms a micron or nano-scale rough peak-valley structure on the surface thereof, and once ultrafine pollutants (such as ultrafine carbon particles from car exhaust) in the air are embedded in the peak-valley structure, particles of the ultrafine pollutants cannot be washed by water due to their hydrophobic properties, resulting in surface dirt, which seriously affects the service life of related products.

SUMMARY

Accordingly, it is necessary to provide self-cleaning coatings, self-cleaning fibers, self-cleaning carpets, and uses thereof having longer service life.

A self-cleaning coating includes a porous structure with pores that are in communication with each other. A volume of the pores included in the coating accounts for 20% to 98% of a total volume of the coating. The pores in the porous structure have a pore size ranging from 0.5 nm to 50 nm.

The self-cleaning coating is substantially prepared from a host material. The host material is one or more selected from the group consisting of titanium oxide, zirconium oxide, titanium nitride, silicon oxide, tungsten oxide, g-$C_3N_4$ semiconductor polymer, perovskite semiconductor, silver, iron, gold, aluminum, copper, zinc, tin, and platinum.

Use of the self-cleaning coating as described above in a preparation of a self-cleaning material.

A self-cleaning fiber includes a substrate and the self-cleaning coating as described above. The self-cleaning coating is formed on the substrate, and the substrate is a fiber.

A self-cleaning carpet includes the self-cleaning fiber as described above.

The self-cleaning coating has the porous structure, and the pores therein are in communication with each other, so that air can be flowed between the pores of the coating. Since the adsorption of pollutants is mainly due to van der Waals force and electrostatic force, dense air pores can greatly reduce the effective adsorption points of ultrafine pollutants for van der Waals force. In addition, the volume of the pores included in the coating accounts for 20% to 98% of the total volume of the coating, such a structure can also effectively increase the contacting chance of nanoparticles with the pollutants, give full play to the quantum size advantage of the ultra-high specific surface area of the nanoparticles, thereby effectively improving the self-cleaning rate. Moreover, the self-cleaning coating can also increase the air filling rate, reduce the air circulation resistance, and facilitate the removal of pollutants. In addition, the coating has a smaller pore size, so that the phenomenon that ultrafine pollutants are embedded into the pores and thus cannot be washed away by water can be effectively avoided, thereby prolonging the service life of the products.

Furthermore, the porous structure can form an antistatic surface by cooperating with air, such that the coating has an antistatic effect, thereby reducing the adsorption of the pollutants. In addition, the host material is a conductor material or a semiconductor material, which can further reduce the electrostatic adsorption force, thereby facilitating the removal of the adsorbed pollutants and prolonging the service life of the products. Moreover, the aforementioned host material can make the coating have hydrophilicity and photocatalysis, on the one hand, which can facilitate the easy removal and decomposition of pollutants, and prolong the service life of the products, and the introduction of the hydrophilic materials makes it easier to clean the inside of the pores, and the water flow can also carry the particles of the surface pollutants away from the inside of the pores, on the other hand, which can effectively form a composite optical film stack, thereby reducing the refractive index of the coating and increasing the transparency, thereby improving the appearances of the products.

DETAILED DESCRIPTION OF THE EMBODIMENTS

Figure 1:
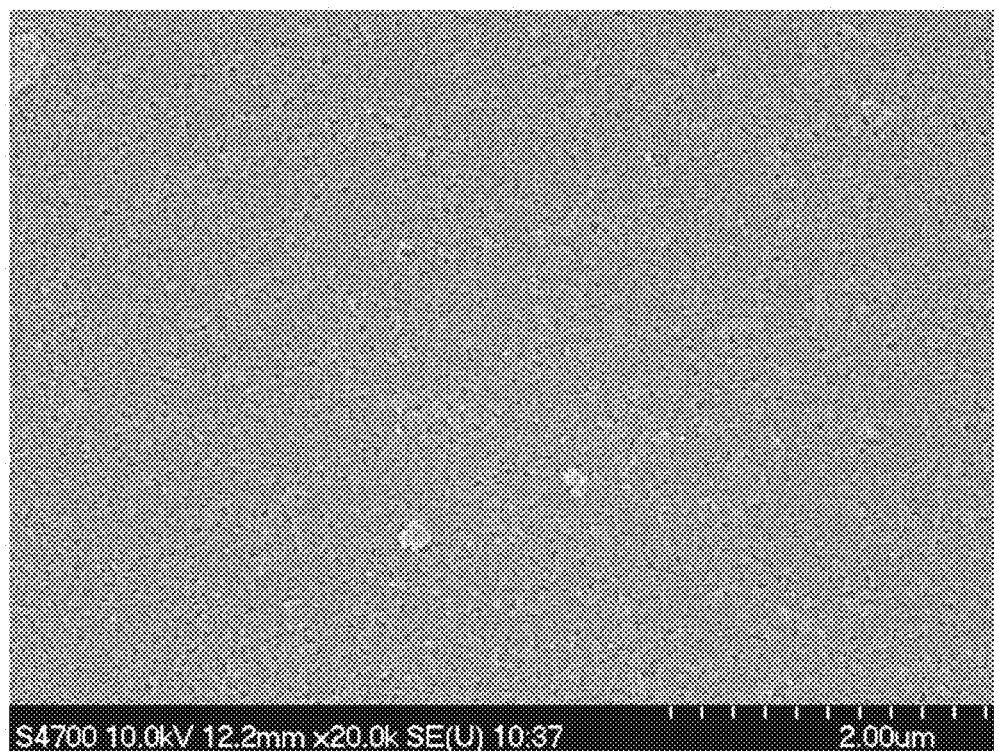
FIG. 1 is a scanning electron microscope photograph of a surface coating of a glass product of an example 1-1 at 2.00 μm.

In order to facilitate the understanding of the present disclosure, the present disclosure will be described more fully below, and preferred embodiments of the present disclosure will be illustrated. However, the present disclosure can be implemented in many different forms and is not limited to the embodiments described herein. On the contrary, providing these embodiments is to assist understanding the contents disclosed by the present disclosure more fully and thoroughly.

Unless otherwise defined, all technical and scientific terms used herein have the same meaning as commonly understood by those skilled in the technical field of the present disclosure. The terms used in the specification of the present disclosure herein are only for the purpose of describing specific embodiments, and are not intended to limit the present disclosure. The term "and/or" as used herein includes any and all combinations of one or more related listed items.

A self-cleaning coating according to an embodiment of the present disclosure has a porous structure with pores that are in communication with each other. A volume of the pores included in the coating accounts for 20% to 98% of a total volume of the coating. The pores have a pore size ranging from 0.5 nm to 50 nm. The self-cleaning coating is substantially prepared from a host material, which is one or more selected from the group consisting of titanium oxide, zirconium oxide, titanium nitride, silicon oxide, tungsten oxide, g-$C_3N_4$ semiconductor polymer, perovskite semiconductor, silver, iron, gold, aluminum, copper, zinc, tin, and platinum.

It should be noted that, the pore size of the pore refers to a distance between two points of the same pore that are farthest from each other on the same cross-section, and the shape of the pore is not particularly limited, as long as the aforementioned pore size range is satisfied.

In addition, in the present disclosure, "volume of pores included in the coating accounting for the total volume of the coating", "content of the pores", "porosity", and "voidage" should be understood to have the same meaning and can be replaced with each other.

In one embodiment, the volume of the pores included in the coating accounts for 40% to 90% of the total volume of the coating.

In one embodiment, the volume of the pores included in the coating accounts for 50% to 80% of the total volume of the coating.

In one embodiment, the pore size of the pores is in a range of 0.5 nm to 40 nm.

In one embodiment, the pore size of the pores is in a range of 0.5 nm to 10 nm.

In one embodiment, the pore size of the pores is in a range of 0.5 nm to 1 nm.

In one embodiment, the host material includes at least materials having two particle sizes, and a particle size ratio of the materials having two particle sizes is greater than 2.

It can be understood that, the materials having different sizes in "the host material including at least materials having two particle sizes" may be the same material or different materials, which are not particularly limited herein.

By selecting the materials at least having two particle sizes as the host material, and the particle size ratio of the materials having two particle sizes is greater than 2, the formation of the coating having the porous structure with smaller pore sizes can be effectively facilitated, on the one hand, which can effectively increase contact area between pollutants and the coating, and on the other hand, which can prevent the pollutants from falling into the pores, thereby improving product life.

In one embodiment, at least one material in the host material has an aspheric crystal structure with a length-width ratio greater than 1.

By selecting the materials having such structure, the porous structure can be formed on the surface by stacking. The materials having such structure can expose broken chemical bonds on its surface as much as possible, thereby improving the relevant properties of the nanoparticles, such as hydrophilicity, photocatalysis, and the like. In addition, it is also conducive to forming the porous structure with smaller pore size, which can effectively prevent the ultrafine pollutants from falling into the pores, thereby enhancing the self-cleaning capability of the coating material and prolonging the service life.

In one embodiment, at least one material in the host material has an aspheric crystal structure with a length-width ratio greater than 1.5.

The aspheric crystal structure may be simple cubic, body-centered cubic, face-centered cubic, simple tetragonal, body-centered tetragonal, simple orthogonal, body-centered orthogonal, single-face-centered orthogonal, multi-face-centered orthogonal, simple monoclinic, simple triclinic, single-face-centered hexagon, rhombic hexahedron, prism, pyramid, bipyramid, spindle, rhombohedron, tetrahedron, and the like.

In one embodiment, the aspheric crystal structure is a cubic-like structure.

In one embodiment, the aspheric crystal structure has a spindle shape. In another embodiment, at least one material in the host material has a spindle-shaped structure with a length-width ratio between 2 and 4.

In one embodiment, at least one material in the host material has a water contact angle of less than 10 degrees.

The material with the water contact angle of less than 10 degrees has higher hydrophilicity, which can effectively improve hydrophilic effect of the self-cleaning coating, and is thus beneficial to form a water film on a surface of the coating and facilitates the removal of pollutants. The hydrophilic material can be metal oxide, metal oxide, polymer, or the like, as long as it does not affect the formation of the porous structure, and which is not particularly limited herein.

In one embodiment, at least one material in the host material has a water contact angle of less than 5 degrees.

In one embodiment, the host material includes at least anatase titanium oxide. The anatase titanium oxide includes a titanium oxide with oxygen defects having a mass percentage of 0.01% to 20%.

The anatase titanium oxide has good photocatalysis and hydrophilicity. The titanium oxide with oxygen defects can enable some oxygen sites of the titanium oxide to form vacancies, change the energy band structure, and improve visible light response. Moreover, while improving the performance of the coating under visible light, the performance of the coating under ultraviolet (UV) light will not be affected, thereby effectively expanding the application range of the products.

In one embodiment, the host material includes at least anatase titanium oxide. The anatase titanium oxide includes a titanium oxide with oxygen defects or a titanium oxide with titanium defects, with a mass percentage of 0.1% to 10%.

In one embodiment, the host material includes at least anatase titanium oxide. The anatase titanium oxide includes a titanium oxide with oxygen defects or a titanium oxide with titanium defects, with a mass percentage of 0.5% to 5%.

In one embodiment, the aforementioned titanium oxide with titanium defects is formed by a cation doping technique. For example, iron, copper, silver, or tungsten replaces titanium.

In one embodiment, the titanium oxide with oxygen defects is formed by an anion doping technique, such as nitrogen doping, carbon doping, or fluorine doping.

In one embodiment, the aforementioned titanium oxide with defects may also formed by a lattice doping technique. For example, iron, copper, silver, tungsten, platinum, nitrogen, carbon, or fluorine is doped into the lattice without replacing the original elements.

In one embodiment, the aforementioned titanium oxide with oxygen defects is nitrogen-doped titanium oxide, which is formed by a nitrogen doping technique.

The formation of nitrogen-doped titanium oxide can effectively improve the absorption of the blue band of visible light, broaden the response range to visible light, and improve the utilization efficiency of the light.

In one embodiment, the anatase titanium oxide further includes quantum dot titanium oxide having a particle size of less than 10 nm.

By adding the quantum dot titanium oxide with the particle size of less than 10 nm, excellent quantum confinement effect and reactivity can be obtained, thereby improving the photocatalytic effect of the coating, and the formation of the coating with the porous structure can be further facilitated, thereby improving the self-cleaning capability of the coating.

In one embodiment, the mass percentage of the quantum dot titanium oxide is in a range of 2% to 30%.

In one embodiment, the mass percentage of the quantum dot titanium oxide is in a range of 5% to 20%.

In one embodiment, the host material is a combination of the titanium oxide and the silicon oxide.

Adopting the combination of the titanium oxide and the silicon oxide can effectively improve the hydrophilic property of the coating, thereby facilitating the washing away of pollutants by water. In addition, the titanium oxide and the silicon oxide have different morphological characteristics, which can facilitate the formation of the porous structure, and improve the anti-adsorption effect of the surface of the coating.

In one embodiment, the silicon oxide is present on a surface of the titanium oxide in a form of surface modification.

The presence of the silicon oxide on the surface of the titanium oxide in a form of surface modification can effectively improve the hydrophilic property of the coating, and enable the pollutants to be easily washed away by water.

In one embodiment, the host material is a combination of titanium oxide, tungsten oxide, and silicon oxide.

Since the forbidden band of tungsten oxide is narrower and thus can absorb a portion of blue wavelength light, the combination of the tungsten oxide and the titanium oxide can better enhance the photocatalytic function of the coating under visible light, thereby improving the self-cleaning capability of the coating.

In one embodiment, the self-cleaning coating is substantially prepared from anatase titanium oxide having a particle size of 10 nm to 50 nm, tungsten oxide having a particle size of 10 nm to 100 nm, silicon oxide having a particle size of 25 nm to 50 nm, and silicon oxide having a particle size of 1 nm to 20 nm.

In one embodiment, the host material is a combination of zirconium oxide and g-$C_3N_4$.

An additional lamellar porous structure can be obtained by adding the g-$C_3N_4$ as a photocatalytic material, thereby improving the self-cleaning effect of the coating. Moreover, the g-$C_3N_4$ can also interact with zirconium oxide to enhance the photocatalytic effect and the antistatic property of the coating, and a non-sticky, photocatalytic, hydrophilic, and antistatic self-cleaning coating is formed.

In one embodiment, the raw materials for preparing the self-cleaning coating further includes a doping material. The doping material is one or more selected from the group consisting of a porous material, a photocatalytic material, an antistatic material, a hydrophilic material, and a hydrophobic material.

In one embodiment, the photocatalytic material is one or more selected from the group consisting of cadmium sulfide, perovskite, zinc oxide, zinc, copper, rare earth metals, silver, platinum, and gold.

It should be noted that, the aforementioned metal elements such as zinc, copper, rare earth elements, silver, platinum, and gold can be directly added to the self-cleaning coating material in the form of metal element, for example, silver nanowires. The metal elements may also be added to the self-cleaning coating material in the form of metal-doped oxide, for example, silver-doped titanium oxide, which is not particularly limited herein.

In an embodiment, the photocatalytic material is one or more selected from the group consisting of polymer semiconductors and fluorescent long persistent materials.

In one embodiment, the photocatalytic material is one or more selected from the group consisting of ZnCdS:Cu, ZnS:Cu, $Gd_2O_3$:$Eu^{30}$.

The aforementioned porous material refers to a material that can increase the content of pores formed by the coating material. Adding the porous material can increase the content of pores of the porous structure in the coating, and reduce the pore size of the pores, thereby improving the cleaning capability. In addition, the air filling rate in the coating can also be increased, thereby enhancing the antistatic property of the coating and preventing the adsorption of pollutants.

The aforementioned porous material can be prepared from a variety of metals and alloys, as well as refractory metal carbides, nitrides, borides, silicides, and the like.

In one embodiment, the porous material is one or more selected from the group consisting of carbon nanotubes, silver nanowires, low-density polyethylene, aluminum oxide, and zinc oxide.

In one embodiment, the porous material is the low-density polyethylene (LDPE).

In one embodiment, the porous material has a porosity of 20% or more.

The antistatic material refers to a material with an antistatic effect. Adding the antistatic material can significantly improve the antistatic property of the coating and effectively avoid the adsorption of pollutants.

In one embodiment, the antistatic material is a surfactant. In another embodiment, the antistatic material is a saturated long carbon chain cationic surfactant.

The hydrophobic material refers to a material with a hydrophobic function. Preferably, the hydrophobic material has a water contact angle of greater than 110 degrees. Adding the hydrophobic material improves the hydrophobicity of the surface of the coating, reduces the adsorption of the particle matter, and air bubbles can also be formed, and the difficulty of pollutants being taken away from the coating by water droplets is reduced.

In one embodiment, the hydrophobic material is one or more selected from the group consisting of silane, fluorosilane, silicone resin, and fluororesin.

In one embodiment, the aforementioned self-cleaning coating is substantially prepared from titanium oxide, fluorosilane, and silicon oxide.

In one embodiment, the self-cleaning coating is substantially prepared from titanium oxide having a particle size of 10 nm to 50 nm, fluorosilane having a particle size of less than 100 nm, and silicon oxide having a particle size of less than 100 nm. The titanium oxide is an anatase titanium oxide, and includes 0.01% to 20% of titanium oxide with oxygen defects.

In one embodiment, the aforementioned self-cleaning coating is substantially prepared from anatase titanium oxide, fluorosilane, silicon oxide, and low-density polyethylene (LDPE). The titanium oxide is the anatase titanium oxide and includes 0.01% to 20% of titanium oxide with oxygen defects.

In one embodiment, the preparation method of the aforementioned self-cleaning coating is as follows: depositing the corresponding raw material on a substrate by a chemical vapor deposition or physical vapor deposition method.

In one embodiment, the preparation method of the aforementioned self-cleaning coating is as follows: coating the corresponding raw material on the substrate by a coating method, and then drying it.

It should be noted that, in the process of preparing the coating, each raw material can be sequentially coated or deposited on the substrate, or several raw materials can be evenly mixed and then coated or deposited on the substrate, as long as the coating having the desired structure can be formed, and which is not particularly limited herein.

For example, the raw materials of the self-cleaning coating are titanium oxide, fluorosilane, silicon oxide, and LIME. The preparation method of the self-cleaning coating including the aforementioned raw materials is as follows. Firstly, an anatase titanium oxide sol is mixed with silicon oxide sol, then a functional layer is formed on a surface of a substrate by the physical vapor deposition method, and then the fluorosilane and LDPE are sequentially deposited on a surface of the functional layer by the chemical vapor deposition method.

Use of the aforementioned self-cleaning coating in the preparation of self-cleaning materials is provided.

The aforementioned self-cleaning coating has a porous structure with free air communication, which can facilitate the removal of pollutants. The porous structure has a smaller pore size, on the one hand, which can avoid the phenomenon that the ultrafine pollutants are embedded into the pores and thus cannot be washed away by water, on the other hand, which can form an antistatic surface by cooperating with air, such that the coating has an antistatic effect, thereby reducing the adsorption of the pollutants, and prolonging the service life of the products. Moreover, the self-cleaning coating has hydrophilicity and photocatalysis, on the one hand, which enables the pollutants to be easily washed away by water, on the other hand, which can facilitate the decomposition of the pollutants and further prolong the service life of the products. Therefore, the aforementioned self-cleaning coating is suitable for preparing self-cleaning materials, and can be prepared into different self-cleaning materials according to different substrates. The substrates may be glass, metal, wood, fiber, or the like.

A self-cleaning fiber according to another embodiment of the present disclosure includes a substrate and the aforementioned self-cleaning coating. The self-cleaning coating is formed on the substrate. The substrate is a fiber. The fibers may be chemical fibers, such as spandex, terylene, nylon 66, polyethylene terephthalate (PET), polyvinyl chloride (PVC), polyurethane (PU), and the like, or may also be natural fibers, such as cotton, fibrilia, and the like.

The aforementioned coating products have strong self-cleaning capability and long service life, and are suitable for preparing self-cleaning textiles, such as blankets, carpets, and the like.

A self-cleaning carpet according to another embodiment of the present disclosure includes the aforementioned self-cleaning fiber. The self-cleaning carpet can be made from the aforementioned self-cleaning fibers by a conventional method for preparing carpets, and which is not particularly limited herein.

Specific examples are listed below to further illustrate the present disclosure.

Example 1

Preparation method of coating material: 19 g of titanium chloride was dissolved in 1000 ml of water, 30 g of ammonium hydroxide (30%) was slowly added at a rate of 1 g per minute. After stirring for 1 hour, the resulting precipitation was washed 3 times with deionized water, 100 g of hydrogen peroxide (30% solution) was then added and was peptized at 15° C. for 12 hours. Then, the peptized solution was put into a hydrothermal reactor and a hydrothermal reaction was carried out at 120° C. for 8 hours to obtain a translucent nitrogen-doped titanium oxide sol. The sol had a spindle shape. The length-width ratio of the spindle shape was controlled between 2 to 4, and the crystallinity of the sol was controlled to be greater than 95%.

The aforementioned coating material was sprayed onto a glass by a physical deposition method to prepare a glass product, which is called an example 1-1.

The aforementioned coating material was evenly applied to a surface of a nylon fiber, and then the fiber was soaked in a 1% of perfluorooctylsilane methanol solution for 24 hours and then taken out and dried to obtain a self-cleaning carpet, which is called an example 1-2.

Example 2

Preparation method of coating material: 24 g of titanium sulfate was dissolved in 1000 ml of water, 30 g of ammonium hydroxide (30%) was slowly added at a rate of 1 g per minute. After stirring for 1 hour, the resulting precipitation was washed 3 times with deionized water, 100 g of hydrogen peroxide (30% solution) was then added and was peptized at 20° C. for 12 hours to obtain a stable sol, and then, 1 g of triethanolamine was added. Then, the sol was put into a hydrothermal reactor and a hydrothermal reaction was carried out at 110° C. for 12 hours to obtain a translucent nitrogen-doped titanium oxide sol. The sol had a spindle shape. The length-width ratio of the spindle shape was controlled between 2 to 4, and the crystallinity of the sol was controlled to be greater than 95%.

The aforementioned coating material was sprayed onto a glass by a physical deposition method to prepare a glass product, which is called an example 2-1.

The aforementioned coating material was evenly applied to a surface of a nylon fiber, and then the fiber was soaked in a 1% of perfluorooctylsilane methanol solution for 24 hours and then taken out and dried to obtain a self-cleaning carpet, which is called an example 2-2.

Example 3

Preparation method of coating material: 8 g of 8 nm spherical hydroxyl surface-modified titanium oxide was taken to be dispersed in 1000 ml of water, sheared and stirred at a high speed for 30 minutes for standby. 15 g of 10 nm spherical silicon oxide alkaline sol (30% wt) was taken to be dispersed in the dispersed solution, and stirred for 10 minutes. 10 g of 50 nm spherical silicon oxide alkaline sol (40% wt) was taken to be dispersed in the dispersed solution, and stirred for 10 minutes.

The aforementioned coating material was sprayed onto a glass by a physical deposition method to prepare a glass product, which is called an example 3-1.

The aforementioned coating material was evenly applied to a surface of a nylon fiber, and then the fiber was soaked in a 1% of perfluorooctylsilane methanol solution for 24 hours and then taken out and dried to obtain a self-cleaning carpet, which is called an example 3-2.

Example 4

Preparation method of coating material: 24 g of titanium sulfate was taken to be dissolved in the 1000 ml of water, and then 9 g of urea was added, stirred uniformly, and slowly stirred and heated to 80° C. for 1 hour. The resulting precipitation was washed 5 times with deionized water, and 0.5 g of concentrated nitric acid was then added and was peptized at 50° C. for 8 hours to obtain a stable sol, and then was put into a hydrothermal reactor and a hydrothermal reaction was carried out at 150° C. for 12 hours to obtain a translucent nitrogen-doped titanium oxide sol, 12 g of 10 nm spherical silicon oxide acidic sol (30% v) was taken to be dispersed in the sol, and stirred for 10 minutes. 8 g of 50 nm spherical silicon oxide acidic sol (40% wt) was taken to be dispersed in the sol, and stirred for 10 minutes.

The aforementioned coating material was sprayed onto a glass by a physical deposition method to prepare a glass product, which is called an example 4-1.

The aforementioned coating material was evenly applied to a surface of a nylon fiber, and then the fiber was soaked in a 1% of perfluorooctylsilane methanol solution for 24 hours and then taken out and dried to obtain a self-cleaning carpet, which is called an example 4-2.

Example 5

Preparation method of coating material: 24 g of titanium sulfate and 0.1 g of silver nitrate was taken to be dissolved in 1000 ml of water, 30 g of ammonium hydroxide (30%) was slowly added at a rate of 1 g per minute. After stirring for 1 hours, the resulting precipitation was washed 5 times with deionized water, 100 g of hydrogen peroxide (30% solution) was then added, and was peptized at 20° C. for 12 hours to obtain a stable sol, and 1 g of tetraethoxysilane was then added. Then, the sol was put into a hydrothermal reactor and a hydrothermal reaction was carried out at 110° C. for 12 hours to obtain a translucent silver silicon doped titanium oxide sol. The sol had a spherical shape. 8 g of 50 nm spherical silicon oxide alkaline sol (40% wt) was taken to be dispersed in the sol, and stirred for 10 minutes.

The aforementioned coating material was sprayed onto a glass by a physical deposition method to prepare a glass product, which is called an example 5-1.

The aforementioned coating material was evenly applied to a surface of a nylon fiber, and then dried to obtain a self-cleaning carpet, which is called an example 5-2.

Example 6

Preparation method of coating material: 24 g of zirconium oxychloride, 1 g of hydrochloric acid, and 10 g of sodium chloride were taken to be dissolved in 1000 ml of water, and then placed in a reactor, and heated up to 200° C. at a rate of 10° C. per minute for 72 hours, and then white precipitated zirconium oxide particles were obtained. The white precipitated zirconium oxide particles had a size of 4 nm to 5 nm and were spherical. After being washed 5 times with pure water, the white precipitated zirconium oxide particles were dispersed by ultrasonic to obtain 1% to 10% of zirconium oxide sol. 20 g of urea was placed in a sealed reactor and heated to 550° C. for 1 hour to obtain about 5 g of g-$C_3N_4$. The g-$C_3N_4$ product was placed in the zirconium oxide sol and was treated with ultrasonic. The g-$C_3N_4$ was gradually peeled off into flakes and formed a complex with the zirconium oxychloride, to form a multilayer porous structure.

The aforementioned coating material was sprayed onto a glass by a physical deposition method to prepare a glass product, which is called an example 6-1.

The aforementioned coating material was evenly applied to a surface of a nylon fiber, and then dried to obtain a self-cleaning carpet, which is called an example 6-2.

Example 7

Preparation method of coating material: 24 g of zirconium oxychloride, 1 g of hydrochloric acid, and 10 g of sodium chloride were taken to be dissolved in 1000 ml of water, and then placed in a reactor, and heated up to 200° C. at a rate of 10° C. per minute for 72 hours, and white precipitated zirconium oxide particles were then obtained. The white precipitated zirconium oxide particles had a size of 4 nm to 5 nm and were spherical. After being washed 5 times with pure water, the white precipitated zirconium oxide particles were dispersed by ultrasonic to obtain 1% to 10% of zirconium oxide sol.

20 g of butyl titanate and 300 ml of absolute ethanol were taken to be mixed, and then were slowly dropwise added to deionized water under strong stirring conditions, and the resulting white precipitate was then filtered and dried to obtain amorphous TiO2. A certain amount of amorphous $TiO_2$ was taken to be added to 10% (w/w) of glucose. After being fully mixed and calcined, a carbon-doped titanium dioxide powder was obtained.

The resulting carbon-doped titanium dioxide powder was added to the zirconium oxide sol. Then, 12 g of 10 nm spherical silicon oxide acidic sol (30% wt) was taken to be dispersed in the above sol, and stirred for 10 minutes. Then, 8 g of 50 nm spherical silicon oxide acidic sol (40% wt) was taken to be dispersed in the above sol, and stirred for 10 minutes.

The aforementioned coating material was sprayed onto a glass by a physical deposition method to prepare a glass product, which is called an example 7-1.

The aforementioned coating material was evenly applied to a surface of a nylon fiber, and then the fiber was soaked in a 1% of perfluorooctylsilane methanol solution for 24 hours and then taken out and dried to obtain a self-cleaning carpet, which is called an example 7-2.

Example 8

Preparation method of coating material: 24 g of zirconium oxychloride, 1 g of hydrochloric acid, and 10 g of sodium chloride were taken to be dissolved in 1000 ml of water, and then placed in a reactor, and heated up to 200° C. at a rate of 1.0° C. per minute for 72 hours, and white precipitated zirconium oxide particles were then obtained. The white precipitated zirconium oxide particles had a size of 4 nm to 5 nm and were spherical. After being washed 5 times with pure water, the white precipitated zirconium oxide particles were dispersed by ultrasonic to obtain 1% to 10% of zirconium oxide sol.

10 g of nano-tungsten powder and 500 ml of hydrogen peroxide solution (30%) were taken to be mixed, and then were stirred for 48 hours at 0° C.' to obtain a faint yellow tungsten trioxide sol. The faint yellow tungsten trioxide sol was heated to 120° C. for 4 hours and then taken out to obtain a more stable tungsten oxide sol. The particle size of the tungsten oxide sol was about 15 nm.

5 g of nano-titanium powder and 500 ml of hydrogen peroxide solution (30%) were taken to be mixed, and then were stirred for 24 hours at 0° C. to obtain a yellow peroxytitanate sol. The yellow peroxytitanate sol was heated to 120° C. for 4 hours and then taken out, and a more stable titanium oxide sol can be obtained. The particle size of the titanium oxide sol was about 5 nm.

The zirconium oxide sol, the tungsten oxide sol, and the titanium oxide sol were mixed, and 8 g of 50 nm spherical silicon oxide acidic sol (40% wt) was then added thereto, and the mixture was stirred for 10 minutes.

The aforementioned coating material was sprayed onto a glass by a physical deposition method to prepare a glass product, which is called an example 8-1.

The aforementioned coating material was evenly applied to a surface of a nylon fiber, and then the fiber was soaked in a 1% of perfluorooctylsilane methanol solution for 24 hours and then taken out and dried to obtain a self-cleaning carpet, which is called an example 8-2.

Parameter Measurement of Coating Product

Figure 2:
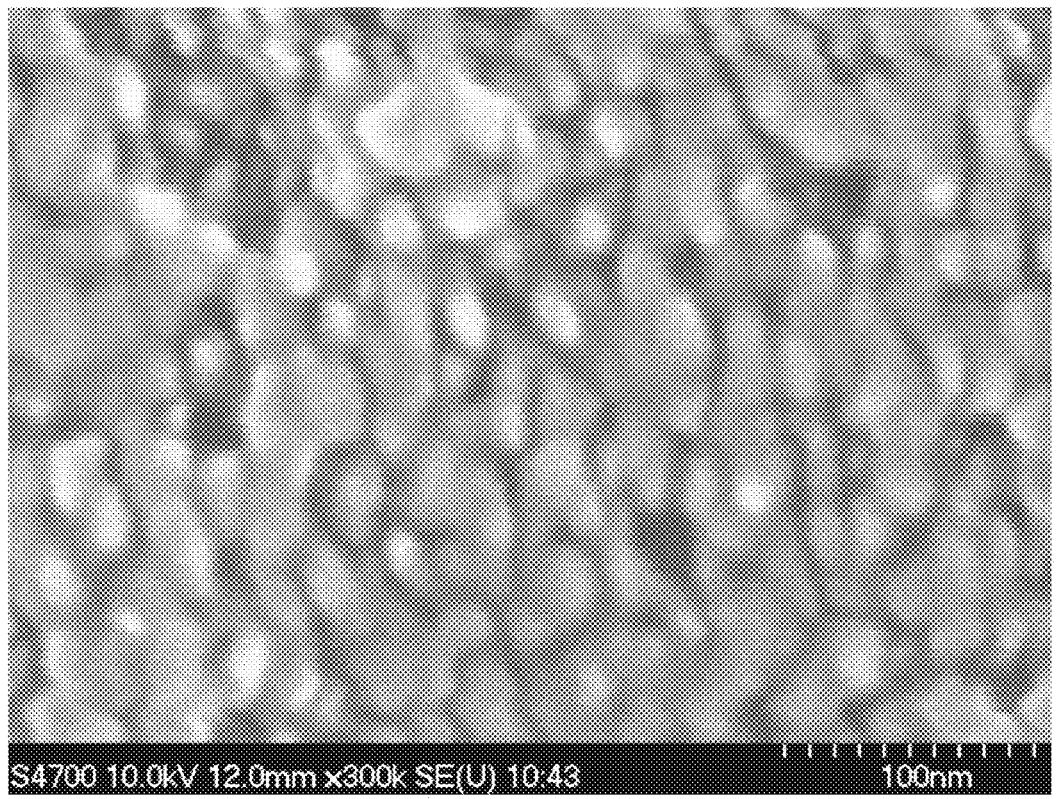
FIG. 2 is a scanning electron microscope photograph of the surface coating of the glass product of the example 1-1 at 100 nm.

An ellipsometer was used to measure the parameters of surface coatings of the glass products of Example 1 to Example 8. The contents of pores in the coatings were measured according to optical calculation results of the ellipsometer. A scanning electron microscope was used to obtain photographs of the coatings of the glass products of Example 1 to Example 8, and then the pore sizes of the pores were measured. The measured results are shown in Table 1. The scanning electron microscope photographs of Example 1 are shown in FIGS. 1 and 2.

TABLE 1

|  | Content of pores | Pore size |
|---|---|---|
| Example 1-1 | 75% | <10 nm |
| Example 2-1 | 68% | <10 nm |
| Example 3-1 | 51% | <10 nm |
| Example 4-1 | 75% | <10 nm |
| Example 5-1 | 79% | <10 nm |
| Example 6-1 | 47% | <10 nm |
| Example 7-1 | 73% | <10 nm |
| Example 8-1 | 90% | <10 nm |

Effect Verification Experiment

Verification Experiment 1

Test Instruments:

Dust spray instrument: MINKS 183S, 9.5 Liters;

Mobile pressure sprayer: MFCLUBE GmbH-1508, 16 Liter;

Nozzle: D IVASprühtechnikGmbH type full cone 1/8, DBLM 8°-120°, 1.4305;

UV lamp (UV irradiation room): Philips Actinic TL TL-K 40W; 365±10 nm;

Detector: PeakTech 5085 type, calibrated Si photodiode; 290 nm-390 nm;

Haze meter: BYK-Gardner Haze-Gard Plus;

Test method: the glass products of Example 1 to Example 8 and a blank glass (which was made of the same material as those of Example 1 to Example 8, without self-cleaning coating, hereinafter referred to as blank control) were sequentially subjected to dust spraying, UV irradiation, and water spraying, respectively, and cycled for 2 weeks. The haze (H) of the glasses in each state was tested, and the standard deviation ($\Delta S$) was calculated. When $\Delta H<1\%$, it indicates that the product has a high self-cleaning capability. The test results are shown in Table 2.

Test parameters: test environment temperature was in a range of 21.6° C. to 23.9° C.

UV irradiation for 24 hours: the maximum temperature of the surface of the glass was 36° C.

Irradiation intensity: irradiated with 1.2 mW/cm$^2$; continuously.

Humidity: 24% rh to 48% rh.

TABLE 2

| | | H | | | | | | | |
|---|---|---|---|---|---|---|---|---|---|
| | | First cycle | | | Second cycle | | | | |
| Number | Initial | Dust spraying | UV irradiation | Water spraying | Dust spraying | UV irradiation | Water spraying | $\Delta H$ | $\Delta S$ |
| Example 1-1 | 0.5 | 6.2 | 4.6 | 1.0 | 5.3 | 3.7 | 0.9 | 0.5 | 0.11 |

TABLE 2-continued

| | | H | | | | | | | |
|---|---|---|---|---|---|---|---|---|---|
| | | First cycle | | | Second cycle | | | | |
| Number | Initial | Dust spraying | UV irradiation | Water spraying | Dust spraying | UV irradiation | Water spraying | ΔH | ΔS |
| Example 2-1 | 0.5 | 6.1 | 4.7 | 0.9 | 5.9 | 4.5 | 1.0 | 0.6 | 0.15 |
| Example 3-1 | 0.5 | 6.7 | 5.1 | 1.1 | 5.9 | 4.1 | 1.0 | 0.6 | 0.16 |
| Example 4-1 | 0.5 | 5.5 | 4.2 | 0.8 | 5.8 | 4.5 | 1.0 | 0.6 | 0.21 |
| Example 5-1 | 0.6 | 5.4 | 3.2 | 0.8 | 5.8 | 4.2 | 1.0 | 0.5 | 0.17 |
| Example 6-1 | 0.4 | 5.6 | 3.8 | 0.9 | 5.8 | 4.3 | 1.0 | 0.6 | 0.16 |
| Example 7-1 | 0.5 | 5.7 | 4.0 | 0.8 | 5.8 | 4.4 | 1.0 | 0.5 | 0.20 |
| Example 8-1 | 0.6 | 5.3 | 3.3 | 0.8 | 5.9 | 4.6 | 1.0 | 0.5 | 0.13 |
| Blank control | 0.4 | 4.6 | 4.5 | 2.1 | 7.0 | 7.1 | 3.9 | 3.6 | 1.48 |

It can be seen from Table 2 that compared with the blank control, the glass products of Example 1 to Example 8 have significantly improved self-cleaning capability.

Verification Experiment 2

A stainmaster stain-resistant carpet Nylon66 material (hereinafter referred to as comparative example 1) produced by INVISTA of USA was used as a control to test the self-cleaning capability of the self-cleaning carpets of Example 1 to Example 8.

Figure 3:
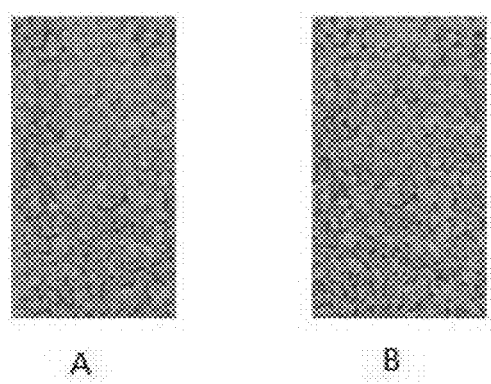
FIG. 3 is a diagram showing surface states of a self-cleaning carpet of an example 1-2 before (A) and after (B) the experiment during an anti-adsorption experiment (1).
Figure 4:
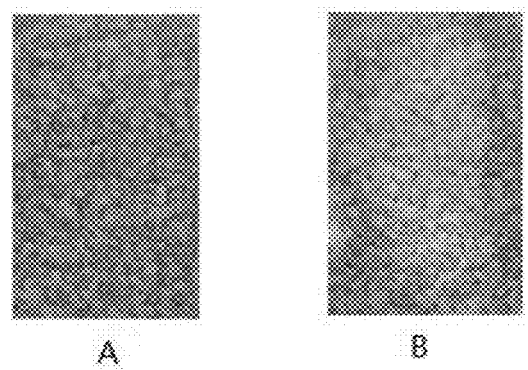
FIG. 4 is a diagram showing surface states of a self-cleaning carpet of a comparative example 1-2 before (A) and after (B) the experiment during an anti-adsorption experiment (1).

(1) Experimental method: the self-cleaning carpets of Example 1-2 to Example 8-2 and comparative example 1 were placed on a flat plate, and then Johnson's talcum powder with the same weight ($m_1$) was applied to the above self-cleaning carpets, respectively. Then, the self-cleaning carpets were shaken respectively, to shake off the powders on them. The shaken powders ($m_2$) were weighed, and the adsorption efficiencies of the powders were calculated according to the formula $(m_1-m_2)/m_1 \times 100\%$ (the test results were shown in Table 3). Then, the appearances of the self-cleaning fibers after shaking off the powders were observed. FIG. 3 is a diagram showing surface states of the self-cleaning carpet of the example 1-2 before (A) and after (B) the experiment. FIG. 4 is a diagram showing surface states of the self-cleaning carpet of the comparative example 1 before (A) and after (B) the experiment.

TABLE 3

| | Adsorption efficiency (%) |
|---|---|
| Example 1-2 | 4.8% |
| Example 2-2 | 6.7% |
| Example 3-2 | 5.3% |
| Example 4-2 | 1.5% |
| Example 5-2 | 3.7% |
| Example 6-2 | 4.2% |
| Example 7-2 | 5.1% |
| Example 8-2 | 3.3% |
| Comparative example 1 | 15.2% |

Figure 5:
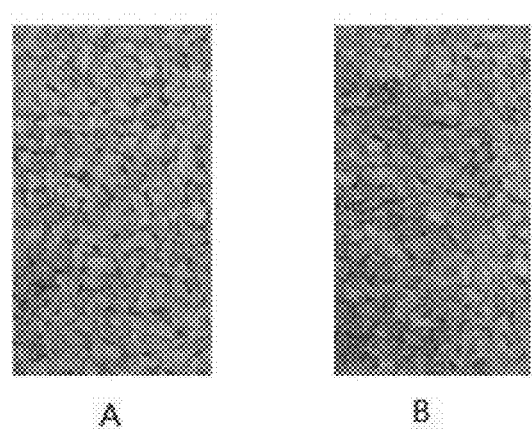
FIG. 5 is a diagram showing surface states of a self-cleaning carpet of an example 1-2 before (A) and after (B) the experiment during an anti-adsorption experiment (2).
Figure 6:
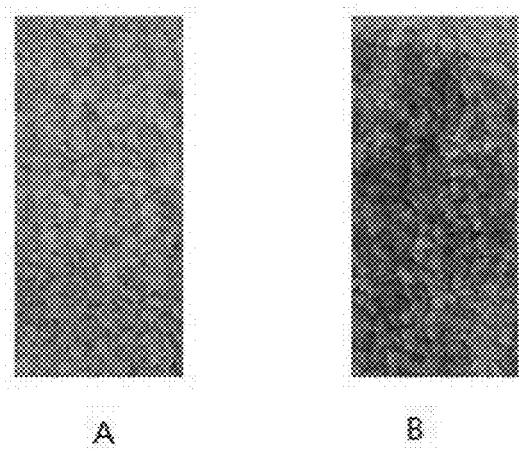
FIG. 6 is a diagram of surface states of a self-cleaning carpet of Comparative Example 1 before (A) and after (B) the experiment during an anti-adsorption experiment (2).

(2) Experimental method: the self-cleaning carpets of Example 1-2 and comparative example 1 were placed on a flat plate, and then carbon powder (Mitsubishi Carbon Black MA100 from Japan) was applied to the self-cleaning carpets of Example 1-2 and comparative example 1, respectively. Then, a vacuum cleaner was used to remove the carbon powders on the surfaces of the self-cleaning carpets, and then the appearances of the self-cleaning carpets after the carbon powders were absorbed were observed. FIG. 5 is a diagram showing surface states of a self-cleaning carpet of Example 1-2 before (A) and after (B) the experiment. FIG. 6 is a diagram showing surface states of the self-cleaning carpet of comparative example 1 before (A) and after (B) the experiment.

Experimental Conclusion and Analysis:

It can be seen from Table 3 that the self-cleaning carpets of Example 1-2 to Example 8-2 have a strong anti-adsorption effect.

In addition, comparing Example 1-2 and comparative example 1, it can be seen that the self-cleaning carpet of Example 1-2 adsorbs less powder (FIG. 3). Even if the carbon powder with strong adsorption was used, the adsorption capacity was still less after a vacuum cleaner was used (FIG. 5). However, the self-cleaning carpet of comparative example 1 had more powder left thereon (FIG. 4), and had a strong adsorption effect on carbon powder. Even if a vacuum cleaner was used, there was still a significant residue (FIG. 6). It indicates that the anti-pollutant adsorption capacity of the self-cleaning carpet of Example 1-2 is significantly stronger than that of the self-cleaning carpet of comparative example 1.

Verification Experiment 3

The fluorocarbon PVDF self-cleaning material (hereinafter referred to as comparative example 2) was used as a comparative example to test the self-cleaning effect of the self-cleaning coating of Example 1.

A flat plate with a smooth and tidy surface was taken to be coated with the coating material of Example 1 on the left side of the flat plate, and to be coated with the coating material of comparative example 1 on the right side of the flat plate, and then it was dried, and standing still.

Figure 7:
FIG. 7 is a state diagram of flat plates including a self-cleaning coating of Example 1 (on left side) and Comparative Example 1 (on right side) after being sprayed with carbon powder.

Carbon powder was evenly sprayed on the aforementioned flat plate, and was stopped after spraying for 1 min. The adsorption of the carbon powder on the left and right sides of the flat plate was observed, as shown in FIG. 7. Then, water was evenly sprayed to the left and right sides of the flat plate to clean the flat plate. After 30 seconds, the spraying was stopped, and the observation was carried out. The result was shown in FIG. 8.

Figure 8:
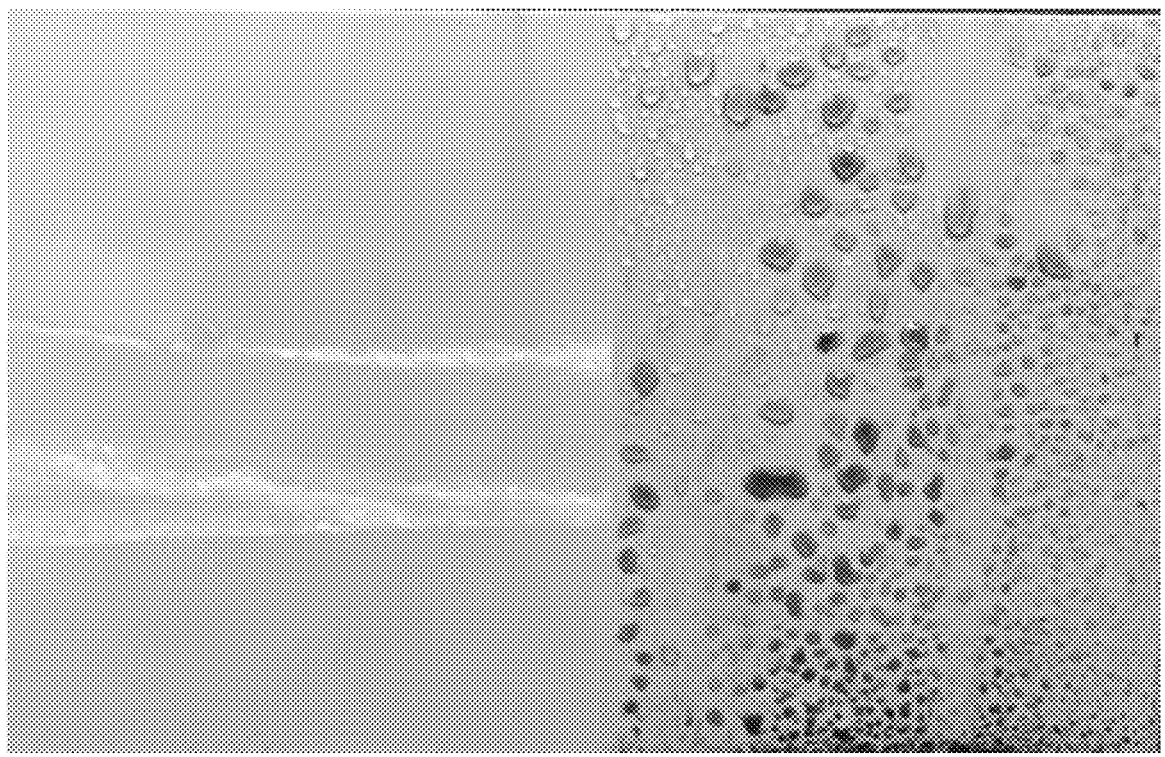
FIG. 8 is a state diagram of flat plates including a self-cleaning coating of Example 1 (on left side) and Comparative Example 1 (on right side) after being sprayed with water.

Comparing FIG. 7 and FIG. 8, it can be seen that after the carbon powder was sprayed, the flat plate including the self-cleaning coating of Example 1 had less adsorption (on the left side of FIG. 7). When water was sprayed, pollutants on the flat plate including the self-cleaning coating of Example 1 were washed away by water (on the left side of FIG. 8), while the flat plate including the self-cleaning coating of comparative example 1 had significant adsorption (on the right side of FIG. 7), and when water was sprayed, water drops on the flat plate were accumulated, and were difficult to drip, and it is difficult to achieve self-cleaning effect (on the right side of FIG. 8). It indicates that the coating product of example 1 has better self-cleaning effect and higher application value.

The technical features of the aforementioned embodiments can be combined arbitrarily. In order to simply the description, all possible combinations of the technical features in the aforementioned embodiments are not described. However, as long as there is no contradiction in the combinations of these technical features, they should be considered to be fallen into the range described in the present specification.

Only several implementations of the present disclosure are illustrated in the aforementioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. A self-cleaning coating, comprising a porous structure with pores in communication with each other, wherein a volume of the pores comprised in the coating accounts for 20% to 98% of a total volume of the coating, the pores in the porous structure have a pore size ranging from 0.5 nm to 50 nm,
    wherein the self-cleaning coating is substantially prepared from a host material, and the host material is one or more selected from the group consisting of titanium oxide, zirconium oxide, titanium nitride, silicon oxide, tungsten oxide, g-$C_3N_4$ semiconductor polymer, perovskite semiconductor, silver, iron, gold, aluminum, copper, zinc, tin, and platinum;
    wherein the host material comprises at least materials having two particle sizes, and a particle size ratio of the materials having two particle sizes is greater than 2.

2. The self-cleaning coating according to claim 1, wherein at least one material in the host material has an aspheric crystal structure with a length-width ratio greater than 1.

3. The self-cleaning coating according to claim 2, wherein at least one material in the host material has a spindle-shaped structure with a length-width ratio between 2 and 4.

4. The self-cleaning coating according to claim 1, wherein at least one material in the host material has a water contact angle of less than 10 degrees.

5. The self-cleaning coating according to claim 1, wherein the host material comprises at least anatase titanium oxide, the anatase titanium oxide comprises a titanium oxide with oxygen defects having a mass percentage of 0.01% to 20%.

6. The self-cleaning coating according to claim 5, wherein the titanium oxide with oxygen defects is nitrogen-doped titanium oxide, carbon-doped titanium oxide, or fluorine-doped titanium oxide.

7. The self-cleaning coating according to claim 6, wherein the titanium oxide with oxygen defects is a titanium oxide with oxygen defects formed by a lattice doping technique.

8. The self-cleaning coating according to claim 5, wherein the anatase titanium oxide further comprises quantum dot titanium oxide having a particle size of less than 10 nm.

9. The self-cleaning coating according to claim 4, wherein the host material is a combination of the titanium oxide and the silicon oxide; or
    the host material is a combination of the titanium oxide, the tungsten oxide, and the silicon oxide.

10. The self-cleaning coating according to claim 1, wherein raw materials for preparing the self-cleaning coating further comprises a doping material, the doping material is one or more selected from the group consisting of a porous material, a photocatalytic material, an antistatic material, a hydrophilic material, and a hydrophobic material.

11. The self-cleaning coating according to claim 10, wherein the doping material is one or more selected from the group consisting of carbon nanotubes, silver nanowires, low-density polyethylene, aluminum oxide, and zinc oxide.

12. The self-cleaning coating according to claim 10, wherein the photocatalytic material is one or more selected from the group consisting of cadmium sulfide, perovskite, zinc oxide, ZnCdS:Cu, ZnS:Cu, $Gd_2O_3$:$Eu^{3+}$, and rare earth metals.

13. The self-cleaning coating according to claim 10, wherein the hydrophobic material is one or more selected from the group consisting of silane, fluorosilane, silicone resin, and fluororesin.

14. The self-cleaning coating according to claim 13, wherein the hydrophobic material has a water contact angle of greater than 110 degrees.

15. A self-cleaning fiber, comprising a substrate and the self-cleaning coating according to claim 1 formed on the substrate, the substrate being a fiber.

16. A self-cleaning carpet, comprising the self-cleaning fiber according to claim 15.

17. The self-cleaning coating according to claim 1, wherein the pores in the porous structure have a pore size ranging from 0.5 nm to 10 nm.

18. A self-cleaning coating, comprising a porous structure with pores in communication with each other, wherein a volume of the pores comprised in the coating accounts for 20% to 98% of a total volume of the coating, the pores in the porous structure have a pore size ranging from 0.5 nm to 1 nm,
    wherein the self-cleaning coating is substantially prepared from a host material, and the host material is one or more selected from the group consisting of titanium oxide, zirconium oxide, titanium nitride, silicon oxide, tungsten oxide, g-$C_3N_4$ semiconductor polymer, perovskite semiconductor, silver, iron, gold, aluminum, copper, zinc, tin, and platinum.

* * * * *